United States Patent [19]
Magerle et al.

[11] 3,760,402
[45] Sept. 18, 1973

[54] ELECTRICAL INSTALLATION FOR PROTECTING MOVABLE ITEMS

[75] Inventors: Rudolf Magerle, Mannedorf; Fritz Datwyler, Stafa, both of Switzerland

[73] Assignee: Cerberus AG, Mannedorf, Switzerland

[22] Filed: Apr. 3, 1972

[21] Appl. No.: 240,741

Related U.S. Application Data

[63] Continuation-in-part of Ser. No. 838,300, July 1, 1969, abandoned.

[30] Foreign Application Priority Data
July 3, 1968 Switzerland.................... 10022/68
June 5, 1969 Switzerland.................... 8569/69

[52] U.S. Cl.................. 340/280, 310/8.1, 340/261, 340/272
[51] Int. Cl. ............................................ G08b 13/14
[58] Field of Search.................. 340/280, 272, 261; 307/116, 119; 310/8.7, 8.1

[56] References Cited
UNITED STATES PATENTS

| | | | |
|---|---|---|---|
| 3,582,692 | 6/1971 | Palini................................. | 340/280 |
| 3,588,866 | 6/1971 | Schlafly, Jr. ....................... | 340/276 |
| 3,573,817 | 4/1971 | Akers................................. | 340/276 |
| 3,569,747 | 3/1971 | Siegel................................ | 310/8.1 |

OTHER PUBLICATIONS
Ottowitz; Peter J., "A Guide to Crystal Selection," Electronic Design XIV:11 (48–51) May 10, 1966, New York, Hayden Pub. Co. TK7800 E51.

*Primary Examiner*—John W. Caldwell
*Assistant Examiner*—Glen R. Swann, III
*Attorney*—Werner W. Kleeman

[57] ABSTRACT

An electrical installation for protecting articles suspended by suspension means against theft or damage, such installation comprising at least one force transducer means embodying at least one piezo-electric element. The force transducer means is disposed at the suspension means in such a way that it is normally loaded with a force of a steady-state value formed by the weight of the article to be protected. The piezo-electric element possesses a main sensitivity direction and is disposed in such a way that this main sensitivity direction is essentially identical with the direction of the force formed by the weight of the article and applied to said force transducer means. There is also provided charge amplifier means associated with and coupled with said force transducer means for generating a signal when the force acting upon siad force transducer means deviates from the steady-state value by a predetermined small amount either in the sense of an increase or a decrease, and an alarm device means is coupled with and triggered by said signal from said charge amplifier means.

13 Claims, 13 Drawing Figures

PATENTED SEP 18 1973  3,760,402

ELECTRICAL INSTALLATION FOR PROTECTING MOVABLE ITEMS

CROSS-REFERENCE TO RELATED APPLICATION

The instant application is a continuation-in-part application to our commonly assigned, co-pending U.S. application, Ser. No. 838,300, filed July 1, 1969, now abandoned, and entitled: "Electrical Installation For Protecting Movable Items."

BACKGROUND OF THE INVENTION

The instant invention generally relates to protection systems and particularly concerns a new and improved electrical installation for protecting suspended movable items against theft or damage.

In order to protect movable objects against theft or damage, many different techniques are possible. For example, one could utilize ultrasonic or electromagnetic wave protecting techniques wherein such waves are generated throughout a given area to be protected. In this manner, every movement within the protective area would be registered to thus set into operation an alarm device if necessary. This particular technique, however, can not be utilized in rooms or areas in which the objects to be protected are accessible to the public, as would be the case in museuss, for example, inasmuch as every movement by a person would serve to trigger the alarm.

A further prior art technique developed to protect objects against theft or damage involves the provision of light or infra-red barriers in close proximity to and in front of the objects such that an alarm would be triggered with each penetration of the barrier. These types of installations, however, require a construction of the device that exactly fits or matches the objects to be protected. Thus, once these installations are put into use, later changes to such installations are not readily possible. Moreover, this type of installation does not permit the visitor to come sufficiently close to the object. Furthermore, an installation of this type can produce false alarm as when insects, for example, fly through the particular light barrier.

Because of the above drawbacks, other known installations have been developed which employ devices connected directly with the object to be protected and which respond to every movement or removal of the object. For example, it is known to provide a metal strip on the object to be protected onto a back side of a picture or picture frame, for example, or on the underside of an erected object. The metal strip, when in a position of rest, serves to bridge two contacts, but when the object is removed, a power circuit would be opened thus resulting in an alarm. Frequently, several objects to be protected are included in one loop line in the above manner such that an alarm would be triggered when the loop is interrupted at any given point.

In still another known arrangement, as described in German Pat. No. 1,108,111, a magnet is disposed on the object to be protected, for example, on the reverse side of a picture. The magnet serves to close a contact disposed behind it when in a condition of rest, but further causes the contact to open when the object is removed.

In installations of this latter type, however, an alteration of sorts must always be performed at the object for which protection is sought. Such alteration is not always desirable, particularly with respect to promoting the preservation of the object's value. Furthermore, such installation can easily be put out of operation by short circuits of the line or by utilizing an extraneous or foreign magnet. Furthermore, as in the previous cases, the alarm installation of this latter type must be specially fitted or constructed for each particular object for which protection is sought, and thus, a particular or special installation would be required for every different object.

Still, further known alarm installations serve to register each change in location of the object for which protection is sought. In this regard, German Pat. No. 1,121,507 describes an arrangement in which a surface bridging member is provided on the reverse side of a painting, and wherein an alarm is triggered when the capacity changes between the bridging member and stationary sensors. This technique also has the same drawback with respect to the fact that the object for which protection is sought must be altered in some manner and that stationary and special installations must be fitted individually for each object.

In a further arrangement, in accordance with German Pat. No. 1,232,857, movement of a counter-support on which the object for which protection is sought is placed or hung is utilized for triggering the alarm, rather than movement of the object itself. Still, this construction also requires a special fitting for each respective object and alterations to the object itself.

U.S. Pat. No. 3,544,988, entitled "Picture Motion Detection System" granted Dec. 1, 1970, describes a picture protection system wherein a mirror is mounted at the top of the picture frame, the mirror being illuminated by a lamp arranged at the upper end of the suspension system. As long as light reflected from the mirror impinges upon a photoelectric cell arranged adjacent the lamp, such provides an indication that the picture is still hanging upon the wall. Yet the drawback of this type of protection system resides in the fact that it can be easily circumvented through the use of a replacement mirror, and furthermore, does not afford any protection against damage or cutting-out of the picture from the frame. Furthermore, such type system has to be specifically accommodated to each picture which is to be protected.

Other attempts in the prior art have sought to utilize vibrations which would occur during theft or damage of the object for triggering the alarm. Swiss Pat. No. 278,149, for example, describes such an alarm installation in which a contact is opened or interrupted by occuring vibrations. This type of alarm installation, however, can easily be circumvented by merely avoiding vibrations.

Yet a further possibility exists in the utilization of electrical switches in the suspension or erection system of the object, such switches serving to switch or trigger an alarm power circuit when the suspended weight falls below a certain value. Of course, with such an installation, it would be easy to circumvent its protective operation by merely utilizing an additional weight. Furthermore, installations of this type do not serve to register damage occurring to the protected object in the event that the object is not removed. Such damage, for example, could be constituted by parts cut out of the canvas of a picture, or parts of a sculpture knocked off, or acid poured over a picture, and so forth.

Finally, it is mentioned that in U.S. Pat. NO. 3,534,356, granted Oct. 13, 1970, listing as the inventor S.M. Bagno, and entitled "Stress Alarm System" there is described a protective system for objects which are suspended at transverse rods or erected at shelving or frames. Owing to the weight of the object which is to be protected the rods or shelve boards are deformed, and deformation being recorded by a piezo-electric strain gauge. Each change in the deformation of the rod or board triggers an alarm. The drawback of this construction is that by blocking the mobility of the rods or shelve boards the installation can be circumvented and no alarm triggered. Additionally the sensitivity direction of the piezo-electric transducer is transverse to the weight of the object to be protected. Accordingly, the transmission ratio is extremely unfavorable and the installation is correspondingly insensitive.

SUMMARY OF THE INVENTION

Accordingly, a need exists in the art for a protective alarm installation which overcomes all of the above-mentioned drawbacks. It is a primary object of the instant invention to provide a device which satisfies this need.

Further, more specific, yet equally important objects are the provision of a protective alarm installation for suspended objects, such alarm installation protecting against theft or damage, such installation;

a. being operable without necessitating any changes at the object for which protection is sought;

b. being utilizable for various objects having various different weights and different dimensions without requiring modifications of significance;

c. being reliable and sabotage-proof;

d. permitting variable placement or direction of the object to be protected without requiring the performance of new installation; and e. being triggered without a delay in time such that the slightest damage or contact of the object for which protection is sought and the location of the disturbance can readily and quickly be localized.

These objects as well as other objects which will become more readily apparent as the description proceeds are implemented by the instant invention which is characterized by the features that one or more sensors, preferably taking the form of electric force transducers, are provided in the supporting suspension or system for the object to be protected. Such electric force transducers are loaded by the weight of the object for which protection is sought when in a condition of rest. One or more associated amplifiers are coupled with the electric force transducers and serve to give a signal in any desired direction to an alarm device when the force provided by the weight of the object for which protection is sought and which acts upon the sensors deviates from the rest-or steady-state value or condition. The term electric force transducers or force recorders as utilized herein is to be construed, for example, to include known and commercially available conventional, mechanical-electrical transducers of various constructions of the type which, when acted upon by a force, produce a corresponding electrical signal (voltage, current, charge, for example) which signal is then processed by a conventional matching amplifier, particularly suited for the transducer in such a manner that the output of the amplifier can be monitored by normal monitoring instruments, or can be utilized for triggering or controlling an alarm.

Now in accordance with more specific facets of the electrical installation for protecting articles suspended by suspension means against theft or damage, it is to be recognized that the installation of this development comprises at least one force transducer means embodying at least one piezo-electric element. The force transducer means is disposed in the suspension means in such a way that it is normally loaded with a force of a steady-state value formed by the weight of the article to be protected. This piezo-electric element has a main sensitivity direction and is disposed in such a manner that this main sensitivity direction is essentially identical with the direction of the force formed by the weight of the article and applied to the force transducer means. Charge amplifier means associated with and coupled with the force transducer means generate a signal when the force acting upon the force transducer means deviates from the steady-state value by a predetermined small amount either in the sense of an increase or a decrease, and an alarm device means is coupled with and triggered by the signal from the charge amplifier means.

It is here to be mentioned that in constrast to the previously discussed prior art constructions, and particularly U.S. Pat. No. 3,534,356, there is afforded the decisive advantage that with the inventive protective system there is employed as the force transducer means a piezo-electric crystal which is directly applied to the suspension system of the object so that it is continuously loaded by the weight thereof. It is not possible to sabotage the integrity of the inventive system, as was possible with the prior art security devices heretofore considered. Furthermore, the system of this invention is much more sensitive than the other known prior art constructions or protective systems, since here there is not employed the relationship of a change in the weight to the total weight of the object to be protected, rather owing to the automatic adjustment to an equilibrium weight (input voltage zero) amplification can be selected to be considerably greater and therefore also the sensitivity. In particular, in contrast to the Bagno system of the prior art discussed above there is used for the inventive installation a charge amplifier and no bridge circuit. This is of advantage since in the prior art installation of that patent it is necessary in any event to accommodate the system to the new weight during a change in the installation of the apparatus, whereas with the inventive system owing to the use of a charge amplifier the protection apparatus automatically regulates itself after a certain amount of time to the new weight. Hence, it should be appreciated that the protection apparatus of this development in contrast to the piror art protection systems is also considerably more universally applicable, much more sensitive, and practically free of sabotage possibilities.

BRIEF DESCRIPTION OF THE DRAWINGS

The invention itself will be better understood and further advantageous features thereof will become clear from the following detailed description of preferred inventive embodiments, such description making reference to the appended sheets of drawings wherein.

DETAILED DESCRIPTION OF PREFERRED INVENTIVE EMBODIMENTS

Figure 1:
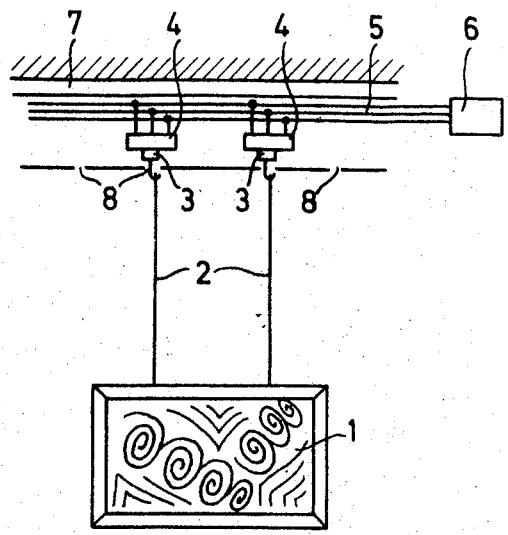
FIG. 1 depicts a front view of a painting suspended at two points by sensors disposed in a track.
Figure 1A:
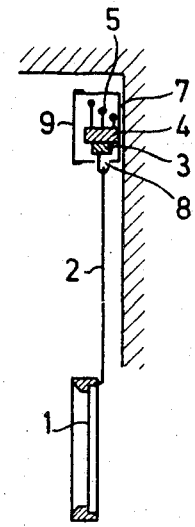
FIG. 1A is a side view of the arrangement of FIG. 1.

In the arrangements depicted in FIG. 1, a painting 1 is disclosed as being suspended on two cables 2 in a normal fashion. The suspending cables are guided to force-sensitive sensors or electric force transducers 3 which are each connected with associated charge or matching amplifiers 4. When the force exerted upon the sensors 3 due to the weight of the painting is changed from a given rest value, the associated charge amplifier 4 generates a signal via one of the lines 5 to an alarm center 6. The remaining parallel running lines 5 supply power to the charge amplifiers. Of course, it is also possible to provide the change amplifiers with a self-contained power supply, such as batteries, for example, or to provide a supervising system for the line in a known manner, such system allowing alarm center supervision so as to increase the operational safety.

The sensors or electric force transducers, as well as the associated charge amplifiers are mounted in a track 7 provided at the wall in the vicinity of the room ceiling, track 7 being equipped with holes 8 at regular intervals allowing passage of the suspension cables 2. Track 7 is closed by a cover 9, thus rendering the electric force transducers and charge amplifiers inaccessible. This cover can be provided with a safety switch, if desired, for increased safety. The above-described arrangements of the electric force transducers or sensors in a track which can be run over a large portion of the entire surface of a wall permits suspension of paintings at any desired location and height and allows replacement of such paintings without difficulty. Since the electric force transducers or sensors respond only to changes in force, it is also possible with the above-described arrangement to protect paintings having different weights without necessitating an adjustment to the installation.

Figure 2:
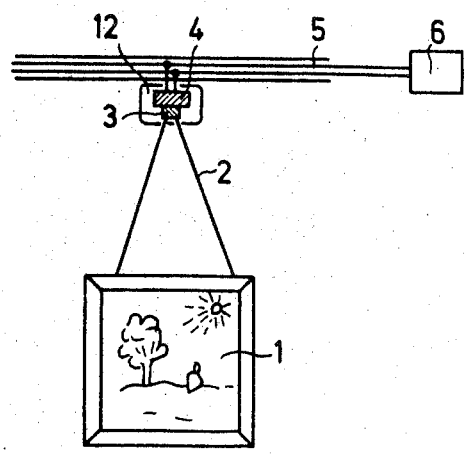
FIG. 2 depicts a front view of a painting suspended at one point in a sensor disposed in a small box in a wall.
Figure 2A:
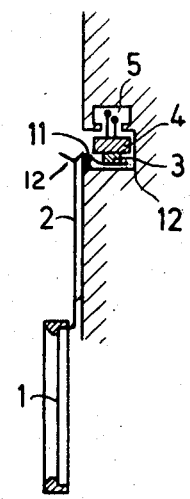
FIG. 2A is a side view of the arrangement of FIG. 2.

While the arrangement pursuant to FIG. 1 can readily be built into existing museum rooms, for example, the arrangement of FIG. 2 depicts a stationary mounting of electric force transducers or sensors as might be provided in new buildings or with renovations of museum rooms, for example.

In FIG. 2, a painting 1 is suspended on suspension cables 2 which is movable via a contact or pivot point 11 to thus transfer, by means of lever action, the force produced by the weight of the painting to an electric force transducer or sensor 3 which, in turn, provides a signal to an alarm center 6 via charge amplifier 4 and one of the lines 5. In this instance, a system comprising two lines is utilized and the signals consist of a change in power of the lines. Here, both the sensor and the charge amplifier are mounted in a hole or small box 12 in the wall. In place of the small box, it is also possible, of course, to provide a horizontal slot over the entire width of the wall or any given portion thereof. A cover can be provided over such slot, and again, the cover can be equipped with a safety switch.

Figure 3:
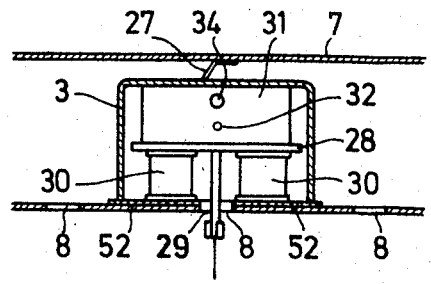
FIG. 3 depicts a front view of a mounting track having a combined sensor and charge amplifier disposed therein.
Figure 3A:
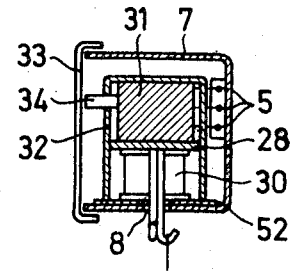
FIG. 3A is a side view of the arrangement of FIG. 5.

FIGS. 3 and 3A depict the construction of an electric force transducer or sensor and its disposition within a mounting track. Mounting track 7 has a U-shaped cross-section and such track can be secured to the wall or ceiling of a room. Mounting track 7 has dimensions such that sensor or transducer 3 is secured within the track by means of a clamping spring 27.

The electric force transducer or sensor consists of a suspension hook 29 secured at a base plate 28, hook 29 transferring the force produced by means of the suspended weight of the object to be protected to two pressure-sensitive or piezo-electric force transducers or recorders 30. This arrangement insures that at least one of the piezo-electric pressure recorders produces a signal not only during the action of a pulling force in a vertical direction, but also during the action of a force which forms an angle from the vertical, such force being of the type which would be produced, for example, when the object to be protected, such as a picture, is displaced laterally. The piezo-electric pressure transducers or recorders 30 serve to generate an electrical charge when acted upon by a force, this charge being transmitted to an amplifier 31 disposed above the piezo-electric sensors. In this instance, the amplifier 31 is constructed as a charge amplifier and is combined with the piezo-electric recorders into one compact unit.

If the force deviates from a steady-state or rest value to any given extent, the charge amplifier 31 provides a signal to an alarm center via one of the lines 5. The charge amplifier includes an adjustment potentiometer 32 for setting the sensitivity. The piezo-electric recorders or transducers are disposed upon a vibration-absorbing base 52 which prevents the triggering of an alarm due to vibrations of the building. Preferably the lower resonance point of the installation is below 500 Hz. Thus, since the mechanical resonance point of the transducer-amplifier unit is below 500 Hz normally occurring building vibrations, e.g., as generated by passing airplanes and the like, will not trigger the alarm due to the absorption of those higher frequency vibrations by the base member 52.

Mounting track 7 has holes 8 on its underside and at regular intervals to allow passage of suspension hooks 29. In this manner, it is insured that paintings can be put up on the wall at any desired location and at any height. It is only necessary for this purpose that the sensors be inserted into the corresponding holes. Providing the connection to cables 5 can be accomplished in a simple manner by means of contacts. Mounting track 7 is preferably closed off toward the front by a cover 33. So as to render the mounting track immune against sabotage or the like charge amplifier 31 further includes a push-button switch 34 which presses against cover or cover plate 33 and serves to trigger an alarm when the cover plate is removed without authorization.

It should be noted that another feature of the present invention resides in the fact that the piezo-electric element of the force transducer has a main sensitivity direction and is disposed in such a manner that this main sensitivity is essentially identical with the direction of the force formed by the weight of the article and applied to the force transducer.

The piezo-electric transducer or recorder can also be constructed in a ring shape with the point of application or attack of the force being provided in the center of the ring. A transducer of this type is not only sensitive to released weight and lateral displacements, but also is sensitive to lifting the picture from the wall.

Of course, it is also feasible to use other known and commercially available conventional force or pressure transducers or recorders as the sensor members herein, such recorders operating as electro-mechanical transducers, so as to convert mechanical quantities such as force or pressure into electrical quantities such as charge, current or voltage, for example. Such other types of commercially available sensors could be electro-dynamic or could operate on the carrier frequency principle. Of course, the charge amplifier utilized in these instances must be selected in accordance with the particular recorder provided, and such amplifier must contain suitable differentiating members or frequency filters where required in known manner.

Figure 4:
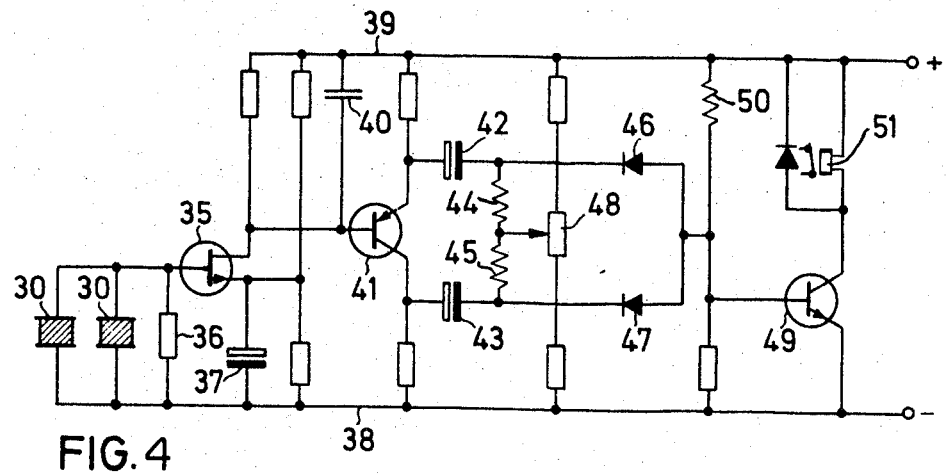
FIG. 4 depicts a circuit utilizing piezo-electric sensors.

FIG. 4 depicts a circuit of a matching amplifier suitable for use with piezo-electric force transducers or recorders. The matching amplifier herein is constructed as a charge amplifier. The piezo-electric force transducers 30 are disposed in parallel across the gate electrode of the field-effect transistor 35 which in itself represents an amplifier with particularly high input resistance. Resistance 36 serves to set the operating point of the field-effect transistor 35 and, at the same time, serves to produce the desired circuit time-constant as does an electrolytic capacitor 37 between the source electrodes of field-effect transistor 35 and the negative supply line 38. A further capacitor 40 is disposed between the drain electrode of field-effect transistor 35 and the positive supply line 39, capacitor 40 serving to set the upper frequency transmission limit of the amplifier. In a preferred inventive embodiment, the time-constant of the amplifier circuit is selected not to exceed 10 seconds; whereas the upper frequency transmission limit of the amplifier should not exceed 500 Hz and the lower frequency transmission limit should lie between 0.1 Hz and 2 Hz.

The output signal of field-effect transistor 35 is amplified in the usual manner by a transistor 41. Rectification of the amplified signal is accomplished by capacitors 42 and 43, resistors 44 and 45, as well as diodes 46 and 47, in circuit, as illustrated. Potentiometer 48 enables setting a certain level which, when exceeded, results in diodes 46 and 47 becoming conductive. By virtue of this arrangement, it is possible to set the sensitivity of the installation in a very simple manner. Such setting can be achieved from the outside by means of a screw 32 as depicted in FIG. 3. A further transistor 49 is coupled in series with a resistor 50 such that transistor 49 conducts during normal operation. As soon as one of the diodes 46 or 47 becomes conductive due to the fact that a signal exceeds the given set level, transistor 49 blocks and causes relay 51 to drop off. The dropping of relay 51 can be utilized in known manner for giving an alarm. Of course, it is possible to utilize other known amplifier circuits for piezo-electric transducers. Likewise, it is possible to utilize a combination of known circuits for alarm installations.

It should be noted at this point that transistorized circuits of the type above described can be constructed in integrated form and connected with the piezo-electric transducers to form a compact unit. On the other hand, it is also possible to provide a separate recorder and matching or charge amplifier or to construct the amplifier as a unitary body with an alarm installation.

Figure 5:
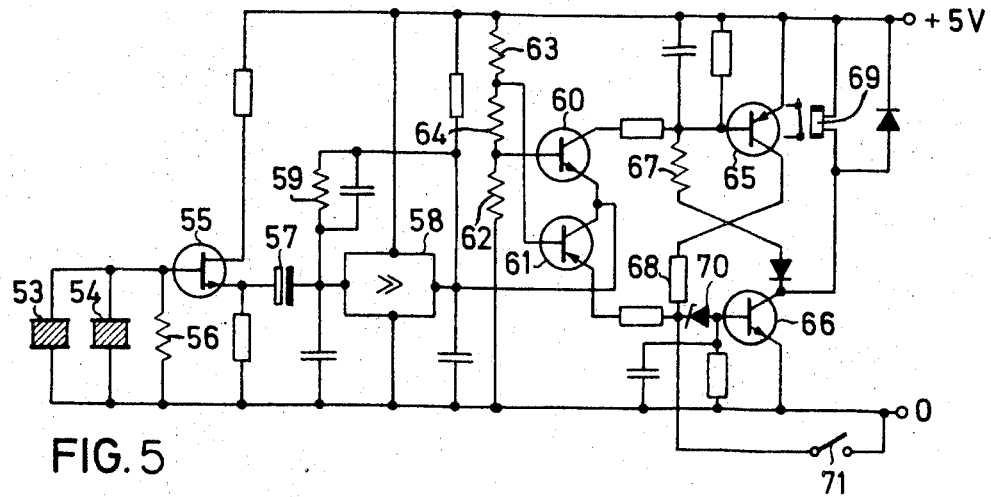
FIG. 5 depicts a further circuit utilizing piezo-electric sensors, and further utilizing integrated circuit portions.

Referring now to FIG. 5, a further circuit is depicted suitable for piezo-electric transducers, such circuit exhibiting portions in integrated form. Two piezo-electric transducers or recorders 53 and 54 are disposed in parallel with a gate electrode of a field-effect transistor 55. In this example, field-effect transistor 55 serves only as an impedance transducer. A resistor 56 disposed at the gate electrode of field-effect transistor 55 must be of as high impedance as is possible depending upon the required time-constant. The signal developed reaches an integrating amplifier 58 via capacitor 57. Resistor 59 serves to stabilize the amplifier and is coupled from the output of the integrating amplifier 58 to the input of the same. The output signal of amplifier 58 is coupled to a trigger circuit, comprising transistor 60 and 61 and resistors 62, 63 and 64. As soon as the amplitude of the output signal exceeds a certain value, one of the two transistors 60 or 61, depending upon the polarity of the signal, becomes conductive and thereby switches one of two transistors 65 or 66. These latter two transistors 65 and 66, together with resistors 67 and 69 form a bistable multi-vibrator. In the event that one of the two transistors 65 and 66 is conductive, a relay 69 is opened. An alarm power circuit can be switched in known manner in response to operation of relay 69. Zener diode 70 enables resetting of the alarm bi-stable multivibrator and thus of the entire installation with the aid of switch 71.

Electrical installations of the type above described operate primarily upon the principle that an electrical charge is stored by the sensor or at a certain location within the matching amplifier. So as to prevent this charge from flowing off, the resistors utilized must therefore be selected to have as high an impedance value as possible. In practice, it is possible, through suitable selection of the resistances, to prevent the charge from flowing off for such a length of time that time-constants of several seconds to several hours can be achieved. It is, therefore, possible, in a very simple manner, to set a new steady state value corresponding to a certain weight of the object for which protection is sought in such a manner that the object can be put up and one can then wait until charge equilibrium is obtained. Accordingly, the installation is independent of the weight of the object for which protection is sought. Yet, there is a disadvantage that, by reducing the value of the resistors unintentionally, such as, for example, by rust contamination or by intentional action, such as an attempt at sabotage, the time-constant of the circuit could be reduced to such an extent that removing the object is possible by lifting it very slowly without causing the alarm installation to respond.

It is, therefore, highly advantageous that provisions be made for an additional elastic member of non-linear characteristics, such member being utilized in addition to force sensors or recorders of the above-described type and be provided at a desired location of the suspension either before or after the force sensors. The elastic member preferably possesses a deflection characteristic which changes suddenly when the load drops below a certain limit. Further, the elastic member is disposed such that a force would be exerted upon the force sensors or recorders during the sudden step-like change of the deflection characteristic.

FIGS. 6 – 9 depict characteristics and constructions of preferred embodiments of such a non-linear elastic member provided in conjunction with the force transducers or sensors.

Figure 6:
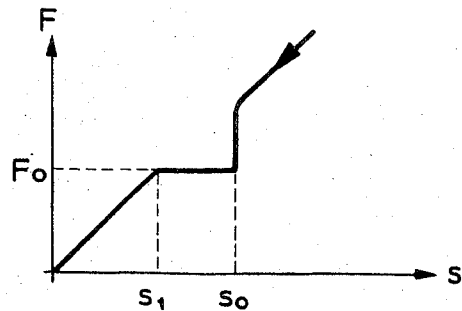
FIGS. 6–9 & 7A illustrate the characteristics and the construction of further modifications to the alarm installation, such modifications utilizing elastic members.

Referring now to FIG. 6 an example of a static force-distance characteristic of a suitable non-linear elastic member is depicted. Proceeding from a relatively large load F acting upon the elastic member, the corresponding deflection S of the member at first drops continuously until it reaches a value $s_o$. Then, as the load is reduced, the deflection remains constant for an instant. However, as the load falls beneath a certain level $F_o$, the deflection suddenly jumps from value $s_o$ to another value $s_1$, without necessitating a further reduction in loading. If the load F is reduced still further, then the deflection reduces further continuously from $s_1$.

It should be noted that it is by no means necessary that the characteristic both above and below the stepping or jump point run in a linear fashion. Furthermore, it is conceivable that several stepping or jumping points are present. It is also conceivable that a so-called bounce-back is indicated at a jump location. Of course, it is a pre-requisite that the characteristic lies completely within the elastic range of distortion of the member. If there is a certain maximum deflection, a plastic distortion or a flow of the material should not occur. The material of the elastic member has to be chosen in accordance with the above principles, and thus, one can utilize spring metals, as well as synthetic rubber or certain elastic plastics having these characteristics. It is also possible to utilize materials having a hysteresis-shaped characteristic in which the force-distance characteristic is different when the force is reduced than that which would be present when the force is increased.

Figure 7:
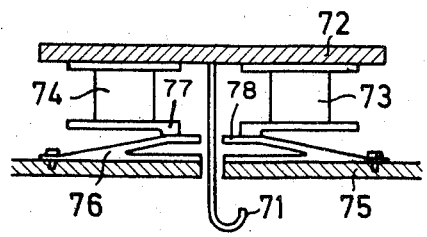
Figure 7A:
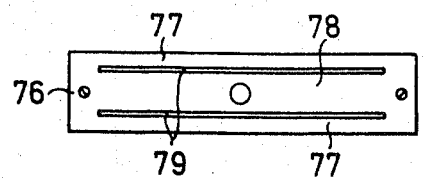

Referring now to FIGS. 7 and 7A, a construction and arrangement of a non-linear member consisting of a flat spring in a piezo-electrical force transducer is depicted. A hook 71 for hanging of the object to be protected, such as a picture, for example, is secured to a base plate 72 which supports two piezo-electric transducers 73 and 74. Accordingly, piezo-electric transducers 73 and 74 are loaded by the weight hanging upon hook 71. A specially shaped flat spring 76 having non-linear characteristics is disposed between the piezo-electrical transducers 73 and 74 and mounting track 75. So as to obtain the desired characteristic, the flat spring 76 is equipped with two longitudinal slots 79 resulting in two outer segments 77 and one inner segment 78. The outer segments 77 have retained their flat shape, whereas the inner segment 78 has been deformed by stretching beyond the limit of elasticity. Now, if the suspension hook 71 is loaded by a sufficiently large weight, the middle portion 78 of the flat spring is almost completely pushed down. As hook 71 is relieved, the middle portion arches more and more until it reaches a critical point where the middle spring portion 78 changes its shape in a step- or jump-like fashion. During this jump-like change, an inertia force is exerted on the piezo-electric transducers 73, 74 as a result of the mass of the object to be protected and suspended from hook 71. This inertia force has the same effect as a sudden change in weight. Accordingly, triggering of an alarm signal results in the same manner as occurs when the force is suddenly changed at the suspension hook. Accordingly, the alarm installation can not be tricked by means of relieving the suspension hook from its weight in a slow manner. If the load falls below a certain limit, a force sufficient for triggering an alarm is exerted in each case on the force sensors by the step- or jump-like change in deflection of the spring.

Figure 8:
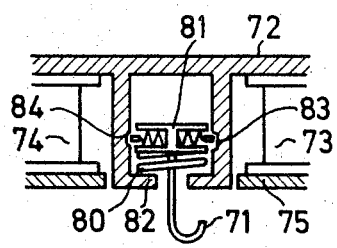

FIG. 8 depicts an arrangement in which the elastic member consists of a spiral spring 80 disposed between a ram or piston 81 secured to suspension hook 71 and the bottom of the cylinder 82 secured to a base plate 72. The piezo-electric transducers 73 and 74 are provided on the underside and are directly connected wih mounting track 75. The step- or jump-point of the elastic characteristic is produced in this embodiment by virtue of the fact that the ram or piston 81 has a bore in which are disposed bolts 83 pre-tensioned by springs. Grooves or holes 84 are provided in the cylinder wall from which the bolts 83 are pushed out when the load on the hook falls below a certain limit. A force thus results which is exerted on transducers 73 and 74 at this time.

Figure 9:
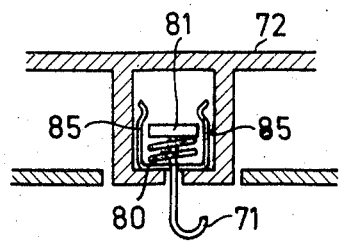

Referring now to FIG. 9, a similar arrangement to that of FIG. 10 which likewise has a spiral spring 80 is depicted. In this instance, the step- or jump-point of the elastic characteristic is caused by specially shaped flat springs 85. If ram or piston 81, which is loaded by the weight normally suspended from hook 71, surpasses the upper detents of the clamping springs 85 as it is slowly relieved, the result is that the spiral spring 80 is suddenly relieved and, here again, a force would be exerted on the sensors. In the constructions depicted in FIGS. 7 and 8 the characteristic is exceedingly steep when dealing with large forces F, i.e., the change of distance or deflection must almost be disregarded above the point of $F_o$ when the force is reduced.

While there is shown and described present preferred embodiments of the invention, it is to be distinctly understood that the invention is not limited thereto but may be otherwise variously embodied and practiced within the scope of the following claims. Accordingly,

We claim:

1. An electrical installation for protecting suspended articles comprising track means positionable along a wall or ceiling of a room for receiving a compact detector unit therein, said compact detector unit comprising force transducer means coupled with a charge amplifier means, means provided on said detector unit for suspending the article to be protected and for loading said force transducer with a force of a steady-state value caused by the weight of said suspended article, said force transducer means including piezo-electric element with a main sensitivity direction oriented in a direction essentially identical with the direction of the force induced by the weight of the article suspended, said coupled charge amplifier means for generating a signal when the force acting upon said force transducer means deviates from said steady-state value by a predetermined value, said track means carrying conductor elements electrically connected to alarm means and constructed with openings to permit variable positioning of said compact detector unit along the length of said track, whereby one or more objects of varying size and weight can be suspended against a wall or the like and readily connected into an existing system.

2. An electrical installation as defined in claim 1, wherein said track has openings at regular intervals for allowing passage of suspension cables.

3. An electrical installation as defined in claim 1, further comprising a track having a cover and mounted at a wall or the ceiling of a room, said compact unit being mounted behind said cover in said track, and wherein several of said compact units are coupled to said alarm device in parallel with one another.

4. An electrical installation as defined in claim 1, wherein said charge amplifier means generates a signal only if said force deviates from said steady-state value by a predetermined amount and within a period of time less than 10 seconds.

5. An installation as defined in claim 1, wherein said charge amplifier means has a lower frequency transmission limit between 0.1 and 2 Hz.

6. An electrical installation as defined in claim 1, wherein said force transducer means and said charge amplifier means coupled therewith have an upper frequency transmission limit less than 500 Hz.

7. An electrical installation as defined in claim 1, wherein said force transducer means comprises two piezo-electric elements, and wherein said force formed by the weight of the article to be protected acts at a point between said two piezo-electric elements in the same direction as the main sensitivity direction of the piezo-electric elements.

8. An electrical installation as defined in claim 1, wherein said charge amplifier means comprises a field-effect transistor having a gate electrode which is connected to one electrode each of said piezo-electric elements.

9. An electrical installation as defined in claim 1, wherein the input voltage at the gate electrode of said field-effect transistor is normally zero as long as said piezo-electric element is loaded by the steady-state value of the weight of the article to be protected and that said field-effect transistor is operated as a linear amplifier in the surroundings of an input voltage being zero and that the output of said field-effect transistor is connected with a threshold detector having one threshold which is positive and another threshold which is negative relative to an input voltage of zero.

10. An electrical installation as defined in claim 9, wherein said alarm device means is connected with said charge amplifier means and emits an alarm signal when the input voltage of said field-effect transistor exceeds the first threshold value or drops below the second threshold value.

11. An electrical installation as defined in claim 1 wherein said compact detector suspending means comprises a connector for receiving a cable attached to said article being protected, said compact detector unit being positioned above said cable.

12. An electrical installation as defined in claim 11 further including lockable cover means attached to said track for totally enclosing said compact detector unit therein.

13. An electrical installation as defined in claim 12, further including safety switch means disposed at said track, said safety switch activating an alarm signal when said cover is removed from said track.

* * * * *